US009696364B2

(12) United States Patent
Im et al.

(10) Patent No.: US 9,696,364 B2
(45) Date of Patent: Jul. 4, 2017

(54) APPARATUS AND METHOD FOR DETECTING FAULT IN DIGITIZER

(71) Applicant: KOREA INSTITUTE OF INDUSTRIAL TECHNOLOGY, Cheonan-si (KR)

(72) Inventors: Dae Yeong Im, Jeollanam-do (KR); Hyun Rok Cha, Gwangju (KR); Bong Kee Park, Gwangju (KR); Jin Ho You, Gwangju (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 434 days.

(21) Appl. No.: 14/529,177

(22) Filed: Oct. 31, 2014

(65) Prior Publication Data
US 2015/0137826 A1 May 21, 2015

(30) Foreign Application Priority Data

Oct. 31, 2013 (KR) ........................ 10-2013-0131557

(51) Int. Cl.
*G01R 31/02* (2006.01)
*G06F 3/041* (2006.01)
*G06F 3/044* (2006.01)

(52) U.S. Cl.
CPC ......... *G01R 31/024* (2013.01); *G06F 3/0416* (2013.01); *G06F 3/0418* (2013.01); *G06F 3/044* (2013.01)

(58) Field of Classification Search
CPC combination set(s) only.
See application file for complete search history.

(56) References Cited

U.S. PATENT DOCUMENTS 6,977,646 B1 * 12/2005 Hauck ................... G06F 3/0418
345/173

FOREIGN PATENT DOCUMENTS

JP         2005512197 A      4/2005
KR          100962550 B1     7/2009
KR       1020130114380 A    10/2013

OTHER PUBLICATIONS

Daeyeong Im, Hyunrok Cha, Pongkee Park, Jinho You and Moonseop Lee, Ohju Kwon, Fault Detector of F-PCB and Digitizer using Electric Field,Proceedings of KIIS Fall Conference 2 vol. 23, No. 2, ISSN2093-4025.

* cited by examiner

Primary Examiner — Robin Mishler
(74) Attorney, Agent, or Firm — Gokalp Bayramoglu

(57) ABSTRACT

Disclosed herein is an apparatus and method for detecting a fault in a digitizer. The apparatus includes a function generator for generating test signals, a transmitting switch for transmitting the test signals generated by the function generator to a selective part or all of X- and Y-channels of a transmitting digitizer, a receiving digitizer arranged in a shape identical to that of the transmitting digitizer to be adjacent to the transmitting digitizer, the receiving digitizer receiving reception signals produced by the transmitting digitizer, a receiving switch for receiving resulting signals, generated by the receiving digitizer in response to the reception signals, from a selective part or all of X- and Y-channels of the receiving digitizer, a channel controller for controlling the transmitting switch and the receiving switch, a data collection unit for collecting the resulting signals, and an analysis unit for analyzing the collected resulting signals.

16 Claims, 7 Drawing Sheets

APPARATUS AND METHOD FOR DETECTING FAULT IN DIGITIZER

BACKGROUND OF THE INVENTION

1. Field of the Invention

The present invention relates generally to an apparatus and method for detecting a fault in a digitizer, which inspect whether a fault has occurred in a digitizer provided in a touch panel and, more particularly, to an apparatus and method for detecting a fault in a digitizer, which can rapidly detect various faults or failures in conducting wires used as the channels of the digitizer within a short inspection time.

2. Description of the Related Art

Generally, a portable personal information processing device, such as a personal computer or a portable transfer device, performs a function of inputting text and/or processing graphics using various input devices such as a keyboard, a mouse, and a digitizer.

Further, in order to efficiently utilize various electronic devices, a touch panel for inputting signals in a display area of a display device without utilizing a remote control or the above-described input devices has been widely used. That is, such a touch panel is installed in the display area of an image display device, such as an electronic scheduler, a flat panel display device such as a Liquid Crystal Display (LCD) device, a plasma Display Panel (PDP), and an Electroluminescence (EL) device, or a Cathode Ray Tube (CRT), and is used to allow a user to select desired information while viewing the image display device.

Such touch panel types may be divided into a resistive type, a capacitive type, an electromagnetic induction type (EL type), etc. according to a method of sensing a touch.

Since the respective touch panel types have characteristics that exhibit problems differently in terms of signal amplification and resolution, as well as difficulty in design and processing technology, it is required to select a touch panel type enabling each advantage to be desirably utilized. For criteria for selection, not only optical characteristics, electrical characteristics, mechanical characteristics, anti-environmental characteristics and/or input characteristics, but also durability and economic efficiency must be taken into consideration.

A basic structure of a resistive touch panel is configured such that an upper transparent plate on which an upper electrode is formed and a lower transparent plate on which a lower electrode is formed are arranged close to each other on opposite surfaces so that a predetermined space is formed between the plates by a spacer. Therefore, the resistive touch panel is configured such that when any one point on the surface of the upper plate is touched by a predetermined input means such as a pen or a finger, the upper electrode formed on the upper plate and the lower electrode formed on the lower plate are electrically connected, and such that an output voltage changes due to the resistance at the point, the changed voltage is read, and then a control device detects location coordinates depending on a change in potential difference.

A basic structure of a capacitive touch panel is configured such that a matrix-type touch key array in which touch keys correspond to intersections of driving electrodes and sensing electrodes is provided on a single substrate. In the capacitive touch panel, if a drive signal is applied to a driving electrode, an output is determined by measuring a variation transferred to a sensing electrode in response to a variation in the drive signal depending on the degree of the capacitive coupling of the drive signal to the sensing electrode. Accordingly, at the intersection of a driving electrode and a sensing electrode indicating a given key, the degree of capacitive coupling between the driving electrode and the sensing electrode is determined depending on whether objects are present near the intersection. Therefore, the capacitive type is a scheme in which, when a finger or a conductive pen touches the touch key array, such an object changes the pattern of an electrical field between the driving electrode and the sensing electrode, thus detecting the location coordinates of the object.

A digitizer is a sensor for recognizing the location coordinates of a touch point which a predetermined input means such as a pen or a finger touches in the touch panel. In the digitizer, since conducting wires are configured in a grid shape, there is a problem in that internal failures or faults, such as irregular intervals between conducting wires, disconnection or short-circuit of the conducting wires, bending of the conducting wires, and/or non-uniform thickness of the conducting wires, occur in a manufacturing procedure.

SUMMARY OF THE INVENTION

Accordingly, the present invention has been made keeping in mind the above problems occurring in the prior art, and an object of the present invention is to provide an apparatus for detecting a fault in a digitizer, which can rapidly detect various faults in conducting wires used as channels of the digitizer within a short inspection time.

Another object of the present invention is to provide a method for detecting a fault in a digitizer, which can rapidly detect various faults in conducting wires used as channels of the digitizer within a short inspection time.

The objects to be accomplished by the present invention are not limited by the above-described objects, and other objects will be more clearly understood by those skilled in the art from the following detailed description.

In order to accomplish the above object, the present invention provides an apparatus for detecting a fault in a digitizer, including a function generator for generating one or more test signals, a transmitting switch for transmitting the test signals generated by the function generator to a selective part or all of X- and Y-channels of a transmitting digitizer, a receiving digitizer arranged in a shape identical to that of the transmitting digitizer to be adjacent to the transmitting digitizer, the receiving digitizer receiving reception signals produced by the transmitting digitizer, a receiving switch for receiving resulting signals, generated by the receiving digitizer in response to the reception signals generated by the transmitting digitizer, from a selective part or all of X- and Y-channels of the receiving digitizer, a channel controller for controlling the transmitting switch and the receiving switch, a data collection unit for collecting the resulting signals transferred from the receiving switch, and an analysis unit for analyzing the resulting signals collected by the data collection unit.

The transmission of test signals and the reception of the resulting signals may be performed in a one-to-many, one-to-one, many-to-one, and many-to-many manner.

Each of the test signals may be a frequency, voltage, or current signal. The frequency signal may have a frequency of a Direct Current (DC), Alternating Current (AC), square or triangle wave.

The reception signals may be electromagnetic signals produced due to electromagnetic induction caused by the test signals transmitted to the X- and Y-channels of the transmitting digitizer. Each of the electromagnetic signals may be a signal having a frequency of a DC, AC, square or triangle wave.

The analysis unit may include an impedance analysis unit and a distribution map analysis unit.

The impedance analysis unit may measure impedance values for the resulting signals, and the distribution map analysis unit may generate a normal distribution map of impedance values for resulting signals from 100 or more fair digitizers and stores the normal distribution map.

The impedance analysis unit may include a Lock-In Amplifier (LIA) for measuring the impedance values for the resulting signals.

The apparatus may further include a fault determination unit for comparing the impedance values for the resulting signals of the receiving digitizer, measured by the impedance analysis unit, with a standard deviation of the normal distribution map stored in the distribution map analysis unit and determining whether faults are present in the X- and Y-channels of the receiving digitizer.

Further, in order to accomplish another object, the present invention provides a method for detecting a fault in a digitizer, including transmitting one or more test signals to a selective part or all of X- and Y-channels of a transmitting digitizer, receiving resulting signals, generated by a receiving digitizer that receives reception signals generated by the transmitting digitizer, from a selective part or all of X- and Y-channels of the receiving digitizer, the receiving digitizer being arranged in a shape identical to that of the transmitting digitizer to be adjacent to the transmitting digitizer, measuring impedance values for the resulting signals, and comparing the impedance values for the resulting signals with a standard deviation of a normal distribution map of impedance values for resulting signals from 100 or more fair digitizers, and determining whether faults are present in the X- and Y-channels of the receiving digitizer.

The transmission of test signals and the reception of the resulting signals may be performed in a one-to-many, one-to-one, many-to-one, and many-to-many manner.

Each of the test signals may be a frequency, voltage, or current signal. The frequency signal may have a frequency of a Direct Current (DC), Alternating Current (AC), square or triangle wave.

The reception signals may be electromagnetic signals produced due to electromagnetic induction caused by the test signals transmitted to the X- and Y-channels of the transmitting digitizer. Each of the electromagnetic signals may be a signal having a frequency of a DC, AC, square or triangle wave.

Measuring the impedance values for the resulting signals may be performed using a Lock-In Amplifier (LIA).

DESCRIPTION OF THE PREFERRED EMBODIMENTS

Figure 1:
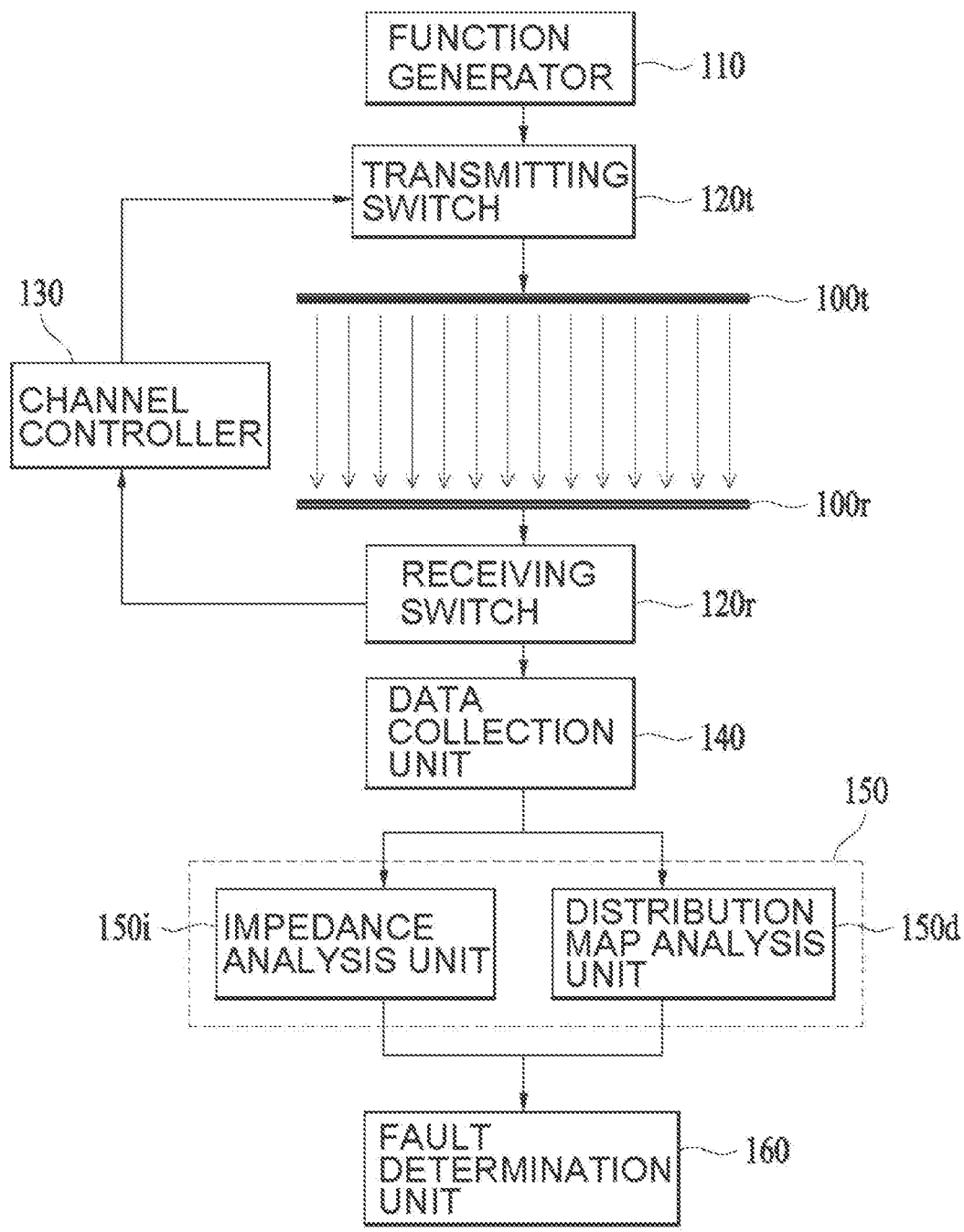
FIG. 1 is a block diagram showing an apparatus for detecting a fault in a digitizer according to an embodiment of the present invention.

Preferred embodiments of the present invention will be described in detail with reference to the attached drawings. The advantages and features of the present invention and methods for achieving the advantages and features will be more clearly understood from the following detailed description of embodiments taken in conjunction with the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The scope of the present invention should be defined by the accompanying claims, and the same reference numerals refer to similar elements throughout.

The terminology used herein is for the purpose of describing particular embodiments only and is not intended to limit the invention. As used herein, the singular forms are intended to include the plural fours as well, unless the context clearly indicates otherwise. It will be further understood that the terms "comprises" and/or "comprising," when used in this specification, specify the presence of stated components, steps, operations, and/or devices, but do not preclude the presence or addition of one or more other components, steps, operations, and/or devices. Further, since the present invention discloses preferable embodiments, reference numerals presented according to the sequence of description are not necessarily limited by such a sequence. In addition, in the present specification, an expression indicating that a first film is disposed on a second film or substrate means that the first film may be directly formed on the second film or substrate, or a third film may also be interposed between the first and second films.

Furthermore, the embodiments described in the present specification will be described with reference to sectional views, plan views and/or perspective views that are ideal exemplary drawings of the present invention. In the drawings, the thickness of films and areas may be exaggerated to provide an easily and effectively understood description of the structure of the present invention. Therefore, illustrated drawings may be modified due to manufacturing technology and/or allowable errors. Thus, embodiments of the present invention are not limited to specific forms shown in the drawings, and may include variations in a form generated according to the manufacturing process. For example, a specific area shown as being at a right angle may have a rounded shape or have a predetermined curvature. Therefore, areas illustrated in the drawings have schematic attributes, and the shapes of areas illustrated in the drawings are intended to illustrate a specific shape of a device and are not intended to restrict the scope of the present invention.

FIG. 1 is a block diagram showing an apparatus for detecting a fault in a digitizer according to an embodiment of the present invention.

Referring to FIG. 1, the digitizer fault detection apparatus includes a function generator 110, a transmitting switch 120*t*, a receiving switch 120*r*, a channel controller 130, an analysis unit 150, a data collection unit 140, a fault determination unit 160, a transmitting digitizer 100t, and a receiving digitizer 100r.

The function generator 110 may generate test signals. Each test signal may be a frequency, voltage or current signal. When the test signal is a frequency signal, it may have the frequency of a Direct Current (DC), Alternating Current (AC), square or triangle wave.

The channel controller 130 may control the transmitting switch 120t and the receiving switch 120r. That is, the channel controller 130 may function to transfer the test signals generated by the function generator 110 to a selective part or all of X-channels and Y-channels of the transmitting digitizer 100t by transmitting respective control signals required to control the transmitting switch 120t and the receiving switch 120r to the transmitting digitizer 100t and the receiving digitizer 100r, and to allow the data collection unit 140 to receive resulting signals generated from the X-channels and Y-channels of the receiving digitizer 100r.

The transmitting switch 120t may transmit the test signals generated by the function generator 110 to a selective part or all of the X-channels and/or Y-channels of the transmitting digitizer 100t in response to a control signal from the channel controller 130. Here, the transmitting digitizer 100t may be a fair digitizer having no faults.

The test signals generated by the function generator 110 are transmitted to the selective part or all of the X-channels and Y-channels of the transmitting digitizer 100t through the transmitting switch 120t. The transmitted test signals may be converted into reception signals that are electromagnetic signals produced due to electromagnetic induction caused by the X-channels and Y-channels of the transmitting digitizer 100t. Such an electromagnetic signal may have the frequency of a DC, AC, square or triangle wave.

The receiving digitizer 100r may be arranged in the same shape as the transmitting digitizer 100t to be adjacent to the transmitting digitizer 100t within the digitizer fault detection apparatus. That is, the transmitting digitizer 1001 may be a fair digitizer manufactured in the same shape as the receiving digitizer 100r. Therefore, when viewed from above, below, left and right, the receiving digitizer 100r may be arranged to completely overlay the transmitting digitizer 100t within the digitizer fault detection apparatus. The receiving digitizer 100r may generate resulting signals in response to the reception signals produced by the transmitting digitizer 100t.

The receiving switch 120r may receive the resulting signals generated by the receiving digitizer 100r from a selective part or all of the X-channels and/or Y-channels of the receiving digitizer 100r in response to a control signal from the charnel controller 130. Here, the receiving digitizer 100r may be a digitizer, the faults of which are to be inspected.

The data collection unit 140 may collect resulting signals received from the receiving switch 120r.

The transmission of test signals to the transmitting digitizer 100r through the transmitting switch 120t in response to the control signal from the channel controller 130 and the reception of the resulting signals by the data collection unit 140 through the receiving switch 120r may be performed in a one-to-many, one-to-one, many-to-one or many-to-many manner.

The analysis unit 150 may include an impedance analysis unit 150i and a distribution map analysis unit 150d. The impedance analysis unit 150i may function to measure impedance values for the resulting signals that are generated by the receiving digitizer 100r and that are collected by the data collection unit 140. The distribution map analysis unit 150d may generate a normal distribution map of impedance values for resulting signals obtained from 100 or more fair digitizers and store the generated normal distribution map.

The fault determination unit 160 may compare the impedance values for the resulting signals of the receiving digitizer 100r measured by the impedance analysis unit 150i with a standard deviation of the normal distribution map stored in the distribution map analysis unit 150d and may determine whether faults are present in the X-channels and Y-channels of the receiving digitizer 100r. That is, the fault determination unit 160 may determine that the receiving digitizer 100r is faulty if the impedance values for the resulting signals of the receiving digitizer 100r measured by the impedance analysis unit 150i deviate from the standard deviation of the normal distribution map stored in the distribution map analysis unit 150d.

FIGS. 2A to 2D are perspective diagrams showing fault detection methods performed by the digitizer fault detection apparatus according to an embodiment of the present invention. In detail, FIGS. 2A to 2D illustrate the transmitting digitizer 100t and the receiving digitizer 100r mounted in the digitizer fault detection apparatus. When viewed from above, below, left or right, the receiving digitizer 100r may be arranged to completely overlay the transmitting digitizer 100t within the digitizer fault detection apparatus.

Figure 2A:
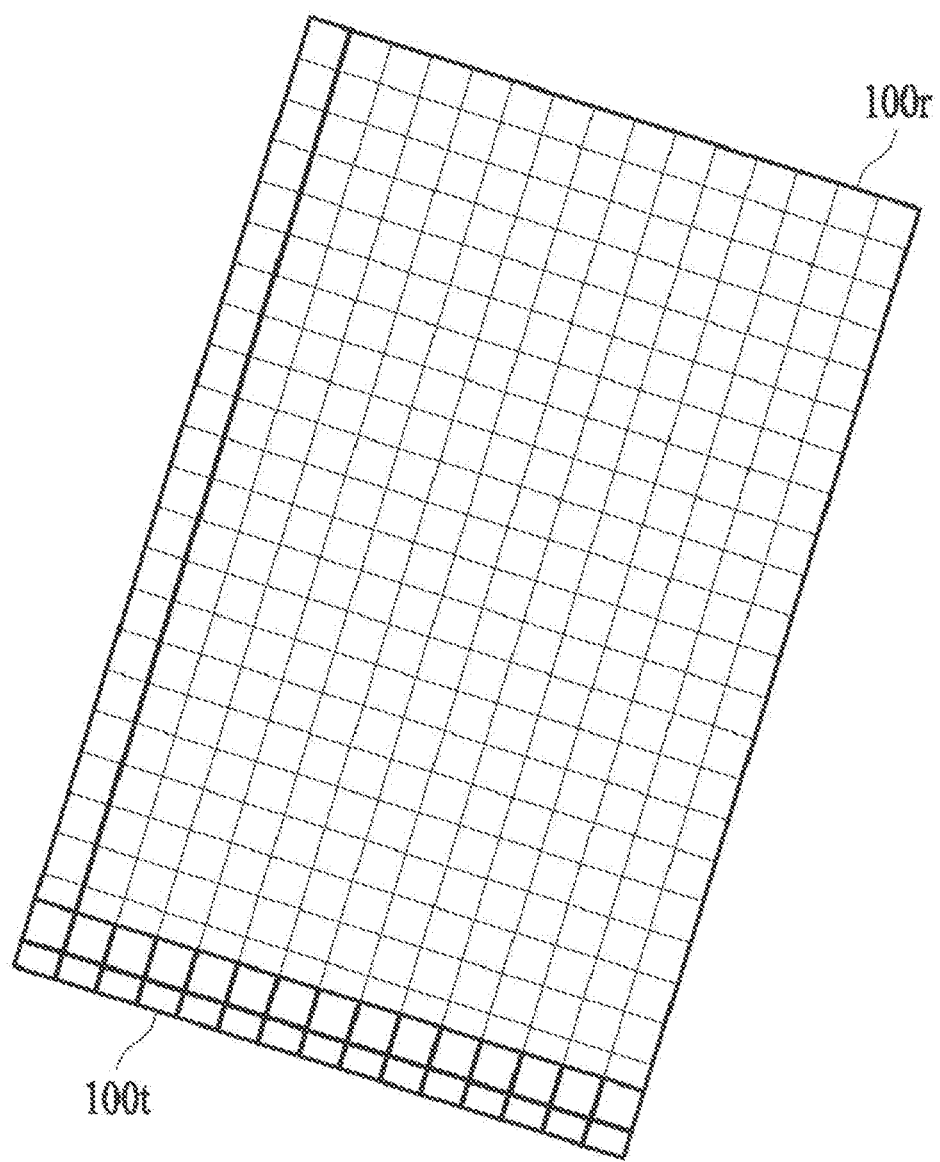
FIGS. 2A to 2D are perspective views of components showing fault detection methods performed by the digitizer fault detection apparatus according to an embodiment of the present invention.

Referring to FIG. 2A, a case where the transmission of test signals and the reception of resulting signals are performed in a many-to-one manner is illustrated. Test signals may be input to all of the X-channels and Y-channels of the transmitting digitizer 100t, and resulting signals from one of the X-channels and Y-channels of the receiving digitizer 100r may be received. That is, FIG. 2A illustrates a method in which, in a state in which test signals are input to all of the X-channels and Y-channels of the transmitting digitizer 100t, resulting signals from one of the X-channels and Y-channels of the receiving digitizer 100r are sequentially analyzed one by one.

Figure 2B:
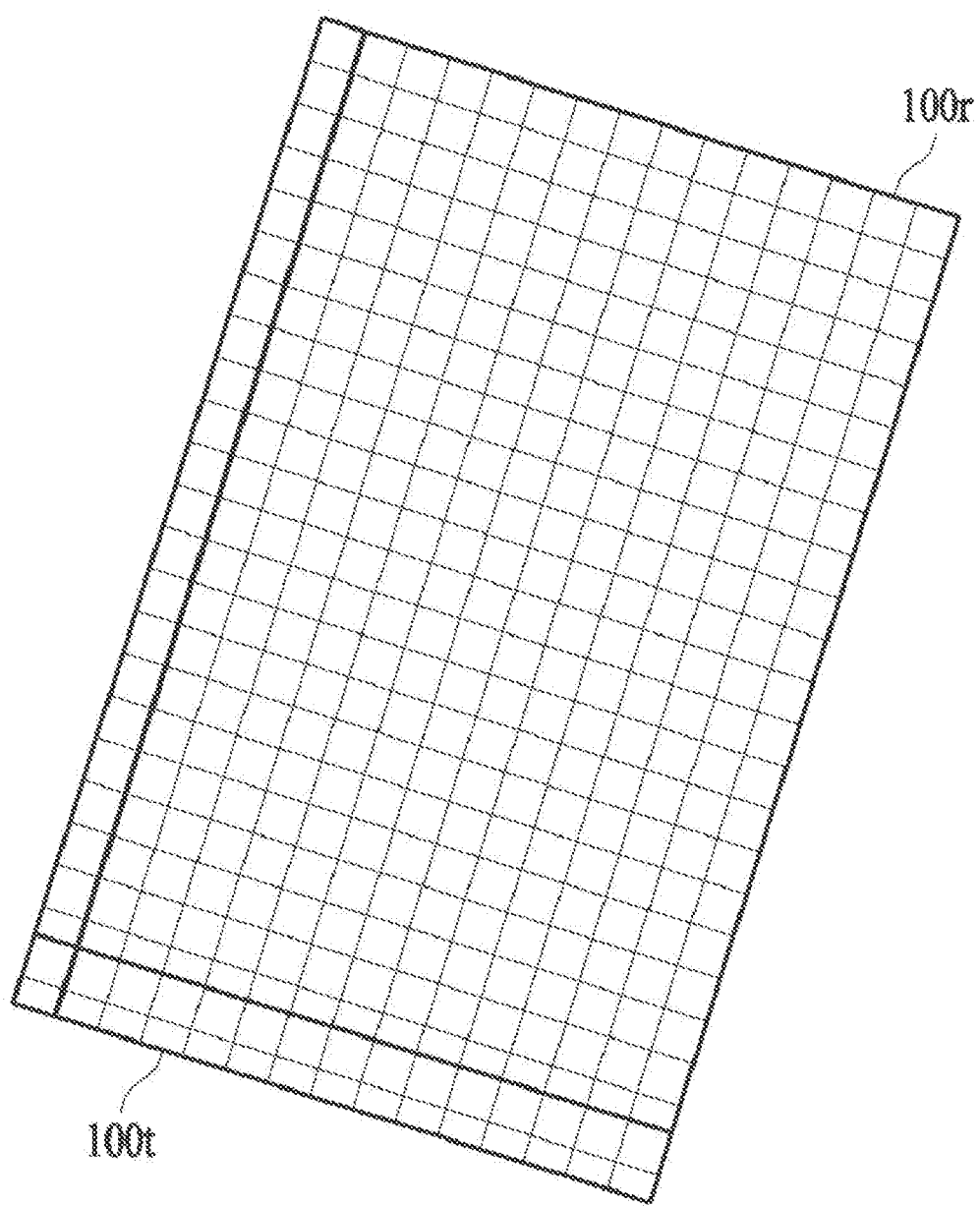

Referring to FIG. 2B, a case where the transmission of test signals and the reception of resulting signals are performed in a one-to-one manner is illustrated. Test signals may be input to one of the X-channels and Y-channels of the transmitting digitizer 100t, and resulting signals from one of the X-channels and Y-channels of the receiving digitizer 100r may be received. That is, FIG. 2B illustrates a method in which, in a state in which test signals are input to one of the X-channels and Y-channels of the transmitting digitizer 1001t, resulting signals from one of the X-channels and Y-channels of the receiving digitizer 100r are sequentially analyzed one by one. Alternatively, the method of FIG. 2B illustrates a method in which, in a state in which the test signals are input to one of the X-channels and Y-channels of the transmitting digitizer 100t, a procedure for analyzing a resulting signal from one of the X-channels and Y-channels of the receiving digitizer 100r, corresponding to the test signal, is sequentially performed.

Figure 2C:
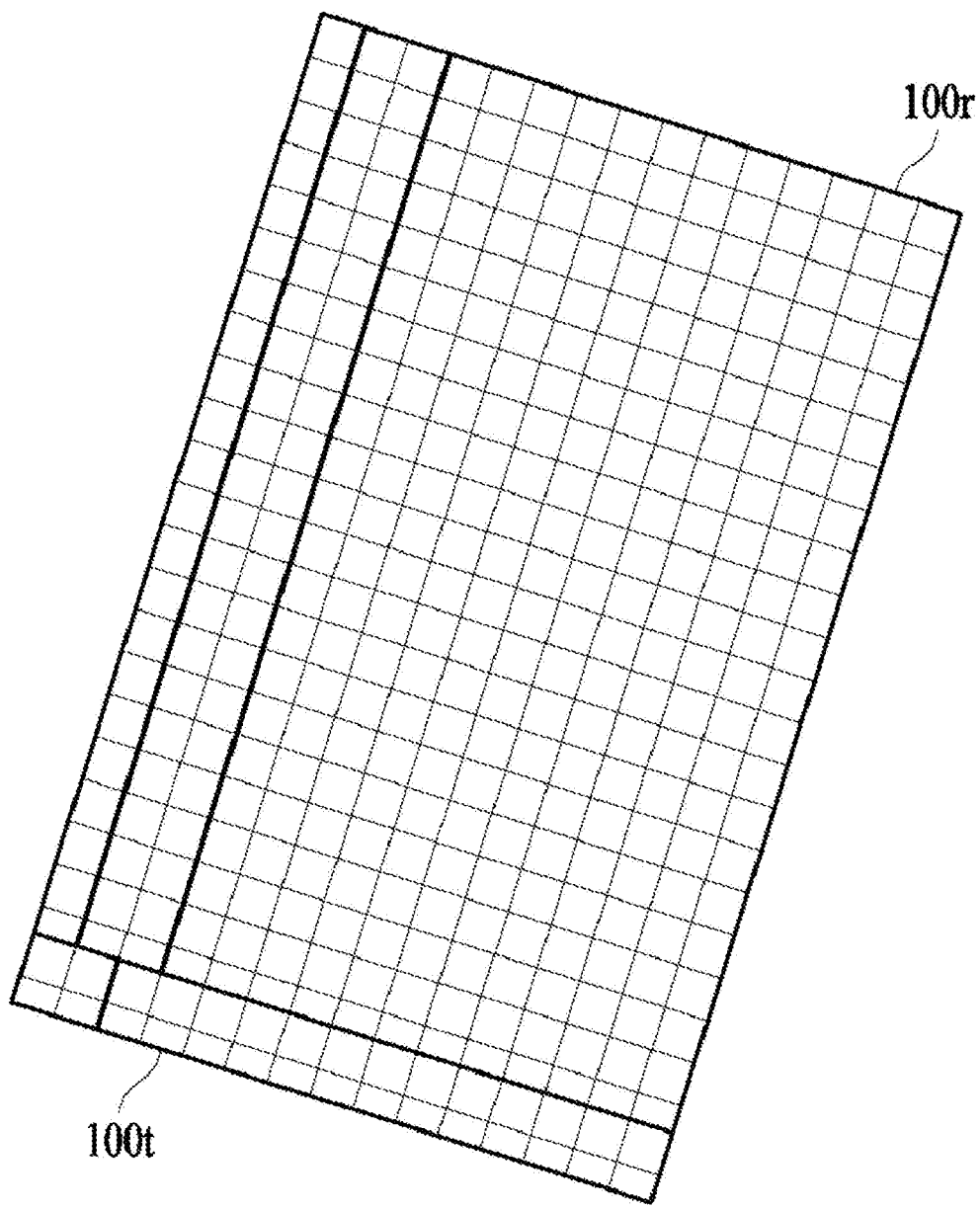

Referring to FIG. 2C, a case where the transmission of test signals and the reception of resulting signals are performed in a one-to-many manner is illustrated. Test signals may be input to one of the X-channels and Y-channels of the transmitting digitizer 100t, and resulting signals from two or more of the X-channels and Y-channels of the receiving digitizer 100r may be received. That is, FIG. 2C illustrates a method in which, in a state in which test signals are input to one of the X-channels and Y-channels of the transmitting digitizer 100t, resulting signals from any two of the X-channels and Y-channels of the receiving digitizer 100r are sequentially analyzed.

Figure 2D:
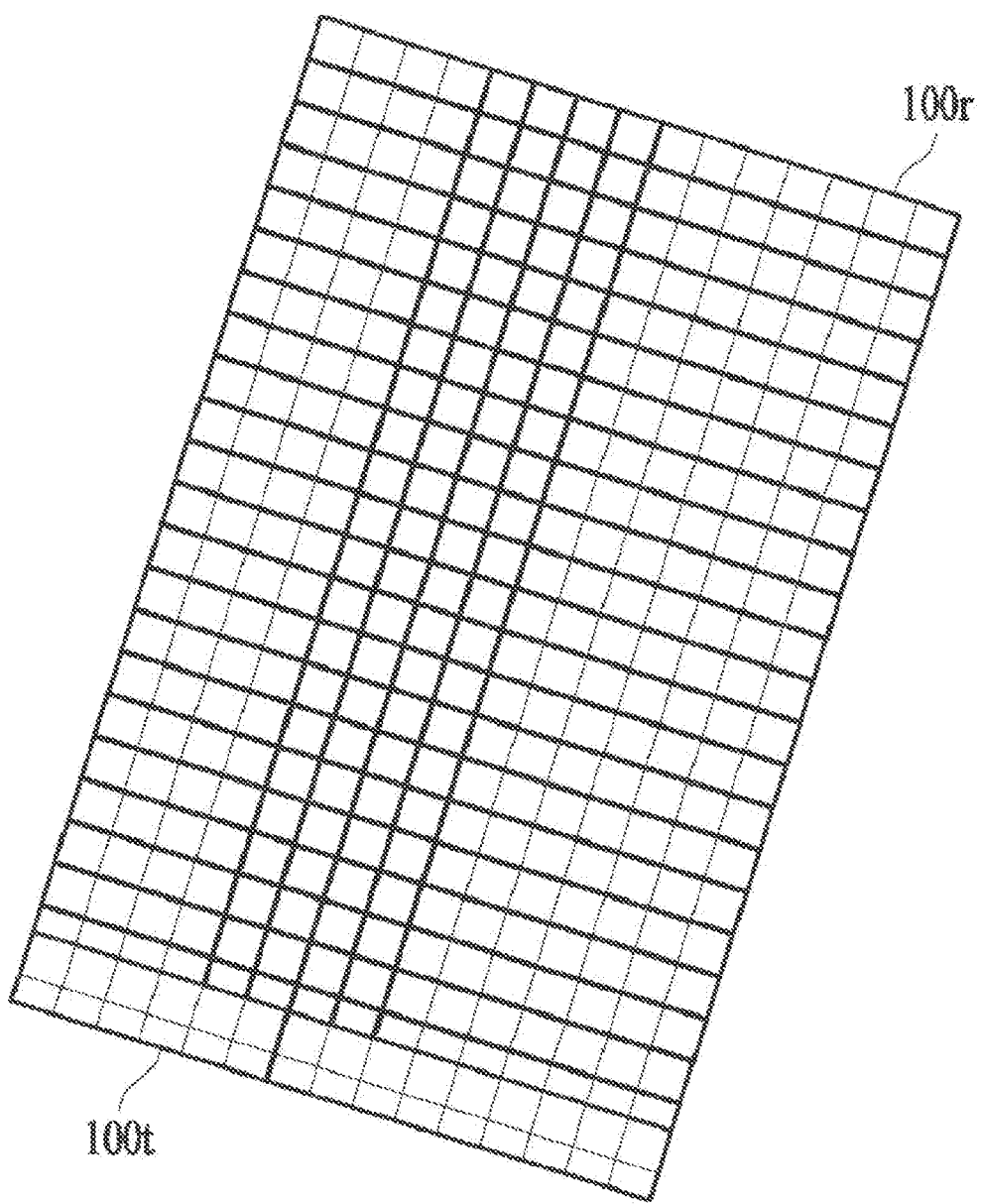

Referring to FIG. 2D, a case where the transmission of test signals and the reception of resulting signals are performed in a one-to-many manner is illustrated. Test signals may be input to one of X-channels and Y-channels of the transmitting digitizer 100t, and resulting signals from two or mote of the X-channels of the receiving digitizer 100r and from all of the Y-channels of the receiving digitizer 100r may be received. That is, FIG. 2D illustrates a method in which, in a state in which test signals are input to one of the X-channels and Y-channels of the transmitting digitizer 100t, resulting signals from two or more of the X-channels of the receiving digitizer 100r and from all of the Y-channels thereof are sequentially analyzed.

Although various examples of the transmission of test signals and the reception of resulting signals by the digitizer fault detection apparatus according to the embodiment of the present invention have been described above with reference to FIGS. 2A to 2D, the present invention is not limited thereto. Various other examples of the transmission of test signals and the reception of resulting signals may be applied to the digitizer fault detection method performed by the digitizer fault detection apparatus.

Figure 3:
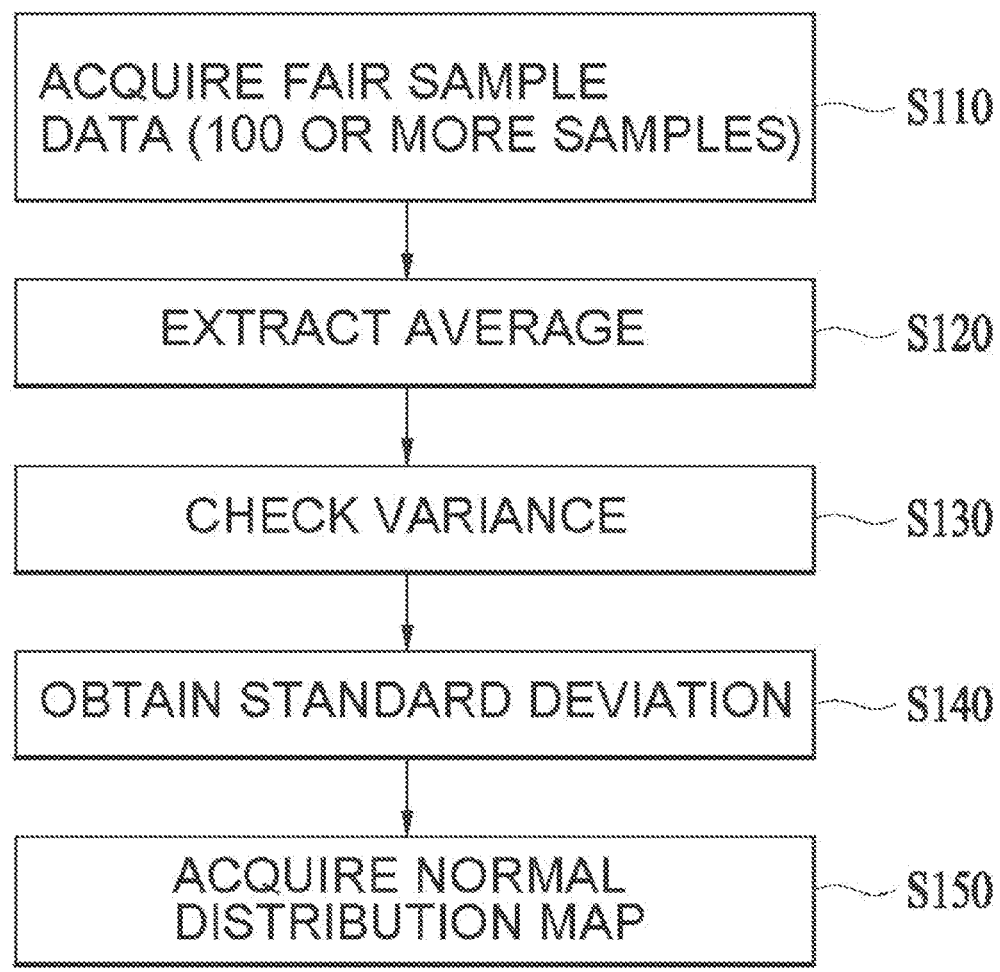
FIG. 3 is a flowchart showing a fault detection method performed by the digitizer fault detection apparatus according to the embodiment of the present invention.

FIG. 3 is a flowchart showing a fault detection method performed by the digitizer fault detection apparatus according to an embodiment of the present invention.

Referring to FIG. 3, the distribution map analysis unit (150d of FIG. 1) of the digitizer fault detection apparatus may generate a normal distribution map of impedance values for the resulting signals measured by the impedance analysis unit (150i of FIG. 1), and store the generated normal distribution map.

The generation of the normal distribution map by the distribution map analysis unit may include the step S110 of acquiring data about impedance values for resulting signals from 100 or more fair digitizers; the step S120 of extracting an average of the acquired impedance values; the step S130 of checking a variance of the acquired impedance values with respect to the average; the step S140 of obtaining a standard deviation from the checked variance; and the step S150 of acquiring a normal distribution map having the standard deviation.

The normal distribution map stored in the distribution map analysis unit may be used as comparative data required to determine whether the receiving digitizer (100r of FIG. 1) is faulty or fair.

Figure 4:
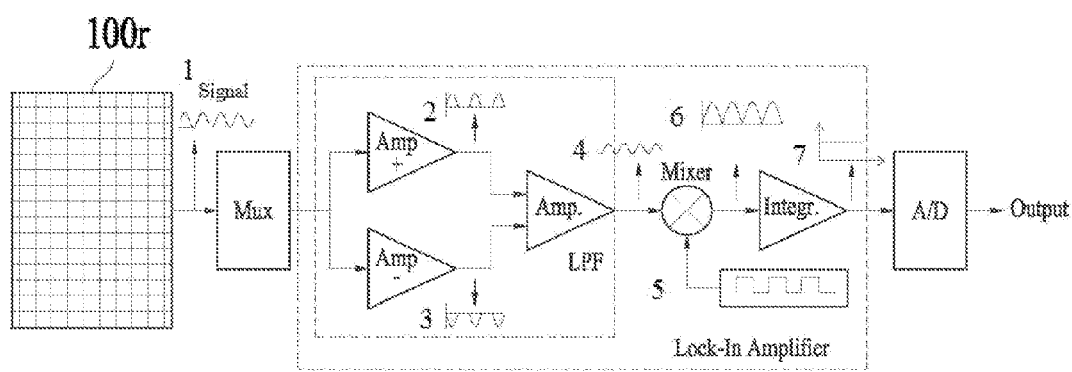
FIG. 4 is a circuit diagram of components showing an additional fault detection method performed by the digitizer fault detection apparatus according to the embodiment of the present invention.

FIG. 4 is a circuit diagram of components showing an additional fault detection method performed by the digitizer fault detection apparatus according to the embodiment of the present invention.

Referring to FIG. 4, a Lock-In Amplifier (LIA) may be used to measure impedance values for resulting signals generated by the receiving digitizer 100r. When impedance values are measured, resistance values are changed even if conducting wires that are the X-channels and Y-channels of the receiving digitizer 100r are thickened or thinned, and thus faults in the conducting wires may be detected.

The circuit of LIA is configured such that resulting signals 1 with noise, which are generated by the receiving digitizer 100r, are input to a multiplexer (MUX). While the resulting signals 1 multiplexed by the MUX are separated into positive signals 2 and negative signals 3 through respective amplifiers (Amp), noise is primarily eliminated from the resulting signals. The positive signals 2 and the negative signals 3 are applied to a single amplifier (Amp) and are restored to original resulting signals 4 from which noise is secondarily removed. The amplifiers that restore the resulting signals 1 to noise-eliminated resulting signals 4 in two stages constitute a Low-Pass Filter (LPF).

The restored resulting signals 4 are multiplied by a reference signal 5 by a mixer and are then converted into half-wave rectified signals 6. The noise of the half-wave rectified signals 6 gradually converges on about '0' and the signal levels of the half-wave rectified signals increase while the rectified signals 6 pass through an integrator (Integr). Therefore, the resulting signals are converted into DC-level signals 7, the noise of which has been completely eliminated. The above-described LPF, the mixer, and the integrator (Integr) constitute the lock-in amplifier (LIA).

The DC level signals 7 are output via an Analog-Digital Converter (ADC). The impedance values of the receiving digitizer 100r output in this way may be compared with the standard deviation of the normal distribution map stored in the distribution map analysis unit 150d. When the impedance values of the receiving digitizer 100r deviate from the standard deviation, the fault determination unit (160 of FIG. 1) determines that the receiving digitizer 100r is faulty.

The digitizer fault detection apparatus according to the embodiment of the present invention generates electromagnetic signals due to electromagnetic induction by transmitting test signals to a selective part or all of X- and Y-channels of the transmitting digitizer by controlling switches; receives resulting signals, generated by the receiving digitizer in response to the generated electromagnetic signals, from a selective part or all of the X- and Y-channels of the receiving digitizer, and analyzes the resulting signals using a distribution map of the resulting signals. Accordingly, the present invention may detect various failures or faults, such as irregular intervals between conducting wires used as channels of the digitizer, the disconnection or short-circuit of the conducting wires, the bending of the conducting wires, and/or the non-uniform thickness of the conducting wires, within a short period of time. Consequently, there can be provided the digitizer fault detection apparatus, which can rapidly detect various faults in conducting wires used as the channels of the digitizer within a short inspection time.

Further, the digitizer fault detection method according to the embodiment of the present invention generates electromagnetic signals due to electromagnetic induction by transmitting test signals to a selective part or all of X- and Y-channels of the transmitting digitizer by controlling switches; receives resulting signals, generated by the receiving digitizer in response to the generated electromagnetic signals, from a selective part or all of the X- and Y-channels of the receiving digitizer and analyzes the resulting signals using a distribution map of the resulting signals. Accordingly, the present invention may detect various failures or faults, such as irregular intervals between conducting wires used as channels of the digitizer, the disconnection or short-circuit of the conducting wires, the bending of the conducting wires, and/or the non-uniform thickness of the conducting wires, within a short period of time. Consequently, there can be provided the digitizer fault detection method, which can rapidly detect various faults in conducting wires used as the channels of the digitizer within a short inspection time.

Although the preferred embodiments of the present invention have been disclosed for illustrative purposes, those skilled in the art will appreciate that the present invention can be practiced in various detailed forms without departing from the technical spirit or essential features of the invention. Therefore, the above-described embodiments should be understood to be exemplary rather than restrictive.

What is claimed is:

1. An apparatus for detecting a fault in a digitizer, comprising:
   a function generator for generating one or more test signals;
   a transmitting switch for transmitting the test signals generated by the function generator to a selective part or all of X- and Y-channels of a transmitting digitizer;
   a receiving digitizer arranged in a shape identical to that of the transmitting digitizer to be adjacent to the transmitting digitizer, the receiving digitizer receiving reception signals produced by the transmitting digitizer;
   a receiving switch for receiving resulting signals, generated by the receiving digitizer in response to the reception signals generated by the transmitting digitizer, from a selective part or all of X- and Y-channels of the receiving digitizer;
   a channel controller for controlling the transmitting switch and the receiving switch;
   a data collection unit for collecting the resulting signals transferred from the receiving switch; and
   an analysis unit for analyzing the resulting signals collected by the data collection unit;
   wherein the analysis unit comprises an impedance analysis unit and a distribution map analysis unit.

2. The apparatus of claim 1, wherein the transmission of test signals and the reception of the resulting signals are performed in a one-to-many, one-to-one, many-to-one, and many-to-many manner.

3. The apparatus of claim 1, wherein each of the test signals is a frequency, voltage, or current signal.

4. The apparatus of claim 3, wherein the frequency signal has a frequency of a Direct Current (DC), Alternating Current (AC), square or triangle wave.

5. The apparatus of claim 1, wherein the reception signals are electromagnetic signals produced due to electromagnetic induction caused by the test signals transmitted to the X- and Y-channels of the transmitting digitizer.

6. The apparatus of claim 5, wherein each of the electromagnetic signals is a signal having a frequency of a DC, AC, square or triangle wave.

7. The apparatus of claim 1, wherein:
   the impedance analysis unit measures impedance values for the resulting signals, and
   the distribution map analysis unit generates a normal distribution map of impedance values for resulting signals from 100 or more fair digitizers and stores the normal distribution map.

8. The apparatus of claim 7, wherein the impedance analysis unit comprises a Lock-In Amplifier (LIA) for measuring the impedance values for the resulting signals.

9. The apparatus of claim 7, further comprising a fault determination unit for comparing the impedance values for the resulting signals of the receiving digitizer, measured by the impedance analysis unit, with a standard deviation of the normal distribution map stored in the distribution map analysis unit, and determining whether faults are present in the X- and Y-channels of the receiving digitizer.

10. A method for detecting a fault in a digitizer, comprising:
    transmitting one or more test signals to a selective part or all of X- and Y-channels of a transmitting digitizer;
    receiving resulting signals, generated by a receiving digitizer that receives reception signals generated by the transmitting digitizer, from a selective part or all of X- and Y-channels of the receiving digitizer, the receiving digitizer being arranged in a shape identical to that of the transmitting digitizer to be adjacent to the transmitting digitizer;
    measuring impedance values for the resulting signals; and
    comparing the impedance values for the resulting signals with a standard deviation of a normal distribution map of impedance values for resulting signals from 100 or more fair digitizers, and determining whether faults are present in the X- and Y-channels of the receiving digitizer.

11. The method of claim 10, wherein the, transmission of test signals and the reception of the resulting signals are performed in a one-to-many, one-to-one, many-to-one, and many-to-many manner.

12. The method of claim 10, wherein each of the test signals is a frequency, voltage, or current signal.

13. The method of claim 12, wherein the frequency signal has a frequency of a Direct Current (DC), Alternating Current (AC), square or triangle wave.

14. The method of claim 10, wherein the reception signals are electromagnetic signals produced due to electromagnetic induction caused by the test signals transmitted to the X- and Y-channels of the transmitting digitizer.

15. The method of claim 14, wherein each of the electromagnetic signals is a signal having a frequency of a DC, AC, square or triangle wave.

16. The method of claim 10, wherein measuring the impedance values for the resulting signals is performed using a Lock-In Amplifier (LIA).

* * * * *